(12) United States Patent
Fortner

(10) Patent No.: US 6,734,659 B1
(45) Date of Patent: May 11, 2004

(54) ELECTRONIC INTERFACE FOR USE WITH DUAL ELECTRODE CAPACITANCE DIAPHRAGM GAUGES

(75) Inventor: Michael W. Fortner, Plano, TX (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 10/064,136

(22) Filed: Jun. 13, 2002

(51) Int. Cl.[7] .................................. G01R 33/00
(52) U.S. Cl. ............... 324/117 R; 324/118; 324/123 R; 73/724
(58) Field of Search ............... 324/117 R, 117 H, 324/118, 123 R, 127, 158.1; 73/708, 718, 724; 361/283.4; 118/723 FI

(56) References Cited

U.S. PATENT DOCUMENTS

| | | | |
|---|---|---|---|
| 4,823,603 A | * | 4/1989 | Ferran et al. ............... 73/724 |
| 5,396,803 A | * | 3/1995 | Ferran ....................... 73/724 |
| 5,948,169 A | * | 9/1999 | Wu ....................... 118/723 FI |

* cited by examiner

*Primary Examiner*—Minh N. Tang
(74) *Attorney, Agent, or Firm*—Gray Cary Ware & Freidenrich, LLP

(57) ABSTRACT

Systems and methods for determining differential currents in a pair of circuits. In a preferred embodiment, an excitation voltage and a tightly coupled differencing current transformer are coupled to a differential capacitance manometer to generate a differential current. This differential current is input to a low-impedance summing node of a charge amplifier that effectively integrates the differential current. A shielding structure surrounding the current transformer and amplifier is driven to the excitation voltage potential. The output of the charge amplifier is passed through a common mode transformer which is coupled to the excitation voltage source in order to remove the guard potential (corresponding to the excitation signal) from the output signal. A synchronous detector then converts the resulting signal to a DC level indicative of the differential capacitance of the sensor.

33 Claims, 3 Drawing Sheets

ELECTRONIC INTERFACE FOR USE WITH DUAL ELECTRODE CAPACITANCE DIAPHRAGM GAUGES

BACKGROUND OF INVENTION

Field of the Invention

The present invention relates generally to measurement systems and more particularly to systems and methods for improving the performance and reducing the cost of Capacitance Diaphragm Gauges ("CDGs") which utilize dual electrode Capacitance Diaphragm Sensors ("CDSs") by improving the electrical interface to the CDS.

Background of the Invention

Capacitance diaphragm gauges (or capacitance diaphragm manometers) are widely used in the semiconductor industry. In part, this is because they are typically well suited to the corrosive services of this industry. They are also favored because of their high accuracy and resistance to contamination. In particular, those CDGs in which the CDS is heated exhibit enhanced resistance to contamination and operate longer without maintenance.

A CDS serves as the vacuum/pressure sensing element within a CDG and may be used to measure and/or control the pressure within a process chamber. A CDS has a housing containing two chambers separated by a circular tensioned diaphragm. The first chamber is in fluid communication with the process chamber or other assembly in which the pressure is to be measured. The second chamber of the CDS is commonly referred to as the reference chamber and is typically (although not necessarily) evacuated and sealed at a pressure which is substantially less than the minimum pressure the sensor will be required to resolve.

The circular, tensioned diaphragm ("the diaphragm") which separates the two chambers within a CDS housing is essentially a thin metal diaphragm which is mechanically constrained about its periphery. The diaphragm reacts to differential pressures by deforming into a bowed shape with the periphery remaining stationary. The diaphragm thereby serves as a flexing, grounded electrode. The diaphragm deforms as a reaction to the pressure difference across it and also interacts with electrostatic fields such that the deformation of the diaphragm may be resolved through these electrostatic interactions.

In close proximity to the diaphragm lies the electrode assembly. This assembly consists of a stiff platform with a polished, electrically insulating surface, which bears two conductive electrodes. The electrode assembly is mechanically constrained a fixed distance from the plane containing the periphery of the diaphragm so that the electrodes are very close to the diaphragm (<0.005 in) and run parallel to its surface. Flexure of the diaphragm, due to applied pressure, can easily be computed by measuring the capacitance to ground at each electrode and subtracting one measurement from another.

Modern CDSs utilize two electrodes to monitor the flexure of the diaphragm. The capacitance to ground of the two electrodes ("common-mode capacitance") varies with flexure of the diaphragm, but also changes with movement of the electrode assembly. Such movement occurs with temperature changes, temperature transients, and mechanical loading. Measurements using the difference in capacitance of the two plates ("difference capacitance") are more stable since they reject motions between the diaphragm and electrodes and instead reflect the deflection of the diaphragm.

Systems that utilize CDGs generally have stringent requirements for the repeatability of pressure readings, with offset drift typically limited to 0.02% of full scale per day. Full-scale deflection typically results in differential capacitance of 0.2 2.0 pF($10^{-12}$ F). 0.02% of this value gives an allowable equivalent change of 0.04–0.4 femtoFarad ($10^{-15}$ F) per day, where some of the change is due to electrical errors when measuring and subtracting the capacitance at the CDS.

The measurement of the CDSs capacitances is performed by the Analog Front End ("AFE") electronics. The AFE is not only responsible for interfacing to the CDS, it also performs the subtraction operation which gives the difference capacitance. Since the full-scale difference capacitance may be as low as 0.2 pF ($10^{\wedge-12}$ F) with a common mode capacitance of 68 pF, even at full-scale, the common mode capacitance is 340 times greater than the difference we wish to measure. For a case involving a daily allowable drift of 0.04 femtoFarad, the common mode capacitance is about 1.7 million times the allowable variation in difference capacitance. Thus the subtraction operation must be extremely well balanced and stable to ensure that the AFE maintains a reasonable drift error.

An obvious source of measurement error within a CDG is the accumulation of incidental capacitance due to interactions between circuits, lead wires, and structures within the construction. These effects even occur on the circuit board and within integrated circuits bringing along leakage currents which makes the circuitry sensitive to humidity and contamination. The solution to these leakage elements is guarding. A node which is surrounded by a conducted surface bearing the same voltage (a "guarding surface") generally will not experience capacitance or leakage current. By surrounding important nodes with guarding, they are free to operate without interference and variations due to shifting, flexing, or changes in humidity. The source and greatest need for guard potential lies, for the most part, in the AFE.

Given the stringent performance requirements of the AFE, few circuit topologies have proven suitable. Three topologies currently dominate the CDG market: the balanced diode bridge; the guarded-secondary transformer bridge; and the matched reference-capacitor bridge.

The balanced diode bridge topology, which is illustrated in FIG. 1, utilizes an excitation source, which provides an alternating voltage to drive the electrodes of the CDS. Charge is alternately supplied to and removed from each of the electrodes through a diode bridge to and from capacitors, $C_A$ and $C_B$. Each of the capacitors serves to supply current to one electrode while discharging current from the other. Thus any imbalance in the capacitance to ground of the two electrodes results in a voltage difference between the output pins of $C_A$ and $C_B$.

Diode bridge AFEs are simple and inexpensive, which makes them a suitable choice for less demanding applications, such as 10 Torr unheated sensors. With stabilized temperature and humidity, they have even been used down to 100 mTorr. However, they generally need to be in close proximity to the CDS since they lack an easy means of producing a useful guard potential. Also, they suffer from diode mismatch and boar contamination issues.

Referring to FIG. 2, a guarded-secondary transformer-based bridge is shown. This circuit utilizes a center-tapped secondary constructed of coaxial cable to produce the excitation voltage along with proportionally increasing guard voltage. The current induced in the CDS by the excitation voltage flows from one electrode of the sensor to the other. Thus, charge is conserved and any differential capacitance results in a net voltage at the center-tap of the innermost conductor of the secondary. A high-input-impedance, unity-gain amplifier follows the center tap of the inner conductor and places a similar voltage on the shield, allowing for guarding. The output of the unity gain amplifier represents the difference capacitance in the sensor. It is amplified and is sent to a synchronous detector to generate a DC level proportional to the difference in capacitance.

When implemented well, the guarded-secondary transformer-based bridge represents a vast improvement over the balanced diode bridge in stability and accuracy. It allows the CDS to be remotely placed through utilization of the same guarded, coaxial cables, which are wrapped about the transformers core. The principal problems with this technology lie in its implementation. The coaxial cable must be of exceptional consistency and must be free of cracks or holes in the shielding. In addition, the guarding method is somewhat Imperfect, being based upon a less than unity gain follower, and stable construction is essential to achieve a stable CDG. Finally, the all shielded construction utilizing coaxial cables can complicate interconnects to and trimming of the CDS.

Referring to FIG. 3, a matched reference-capacitor bridge is shown. This circuit uses a common excitation source to drive both electrodes of the CDS through the summing nodes of a pair of fully-guarded charge amplifiers (guard voltage is on power supplies and common potentials). The charge amplifiers are built around two monolithic operational amplifiers and utilize a pair of matched, precision reference capacitors to establish their gain. The output of the charge amplifiers is fed into a high common-mode rejection difference amplifier. The output of the difference amplifier represents the difference capacitance in the sensor and is sent to a synchronous detector to recover a DC level corresponding to the diaphragm's position.

The matched reference capacitor bridge competes well with the guarded-secondary transformer-based bridge with the added advantage of being smaller. It is somewhat temperature sensitive, however, and it is extremely demanding with respect to component performance. Only the highest quality glass capacitors are suitable as references, and they must be subjected to aging and matching. Also, the difference amplifier must exhibit outstanding and consistent common-mode performance. With such high performance components, the material cost is high for this topology.

A need exists for an AFE topology which utilizes standard construction practices and inexpensive components while being relatively insensitive to temperature and humidity. This topology should feature excellent guarding to allow for ease of connection to a separate, heated sensor assembly and should allow for direct compensation of the sensor's offset.

SUMMARY OF INVENTION

One or more of the problems outlined above may be solved by the various embodiments of the invention. Broadly speaking, the invention comprises systems and methods for determining differential currents in a pair of reactive circuits. In a preferred embodiment, the systems and methods are implemented to provide an improved electrical interface to a sensing element such as a CDS. The improved interface may provide improved performance and reduced cost.

One embodiment of the invention comprises an interface for a CDS utilizing a differencing current transformer and a charge amplifier. The primary windings of the current transformer are coupled between an excitation voltage source and a pair of electrodes within the CDS. The currents passing through the primary windings generate magnetomotive force (MMF) of opposing polarity, so that a current proportional to the difference between the primary currents is induced in the secondary winding of the transformer. The secondary winding is coupled to the summing node of a charge amplifier, thus terminating the secondary of the transformer into a low impedance load. This low impedance termination is reflected back to the primary windings and appears as smaller impedance than the CDS's electrodes. Thus, the voltage presented to the electrodes is extremely close to the excitation voltage, and the excitation voltage becomes an excellent guard potential. Every circuit node associated with the transformer and charge amplifier are referenced, AC-wise, to the guard potential and shielded. This protects the transformer, charge amplifier, and any interconnects from stray capacitance and leakage currents.

Embodiments of the invention typically (though not necessarily) operate the current transformer and its related components at excitation voltage for reasons of guarding as well as providing excitation to the electrodes of a grounded CDS. One embodiment of the invention utilizes a common-mode transformer to translate power supply potentials, as well as signal from the charge amplifier, between those circuits referenced to the excitation voltage and those circuits referenced to ground. An additional winding on the transformer is excited by the excitation voltage and ground, and serves as a source for the other signals, which must be translated. There exist other embodiments of the invention which essentially perform the same operation without the transformer.

The voltage signal recovered from the charge amplifier passes through the common-mode transformer and is fed into a synchronous detector which serves to generate a DC level corresponding to the CDS's applied pressure. The actual means of delivering the signal from the charge amp to the detector may vary, particularly in regard to gain stages.

Another embodiment of the invention comprises a method for measuring current differential comprising coupling one or more primary windings of a current transformer to each of a pair of circuits in which a current differential is to be measured, applying a excitation voltage to the primary windings and corresponding circuits, inducing a differential current on a secondary winding of the current transformer and amplifying the current differential using a charge amplifier. The method may further comprise referencing the charge amplifier to the excitation voltage and guarding the current transformer and charge amplifier by surrounding them with a shielding structure to which the excitation voltage is also applied. The excitation voltage which is added to the charge amplifier signal can then be removed by passing the signal through a common mode transformer on one winding, while the excitation voltage is applied to another winding. The resulting signal can then be fed to a synchronous detector, which produces a DC level output indication of the current differential.

Numerous alternative embodiments are also possible.

BRIEF DESCRIPTION OF DRAWINGS

Other objects and advantages of the invention may become apparent upon reading the following detailed description and upon reference to the accompanying drawings.

Figure 1:
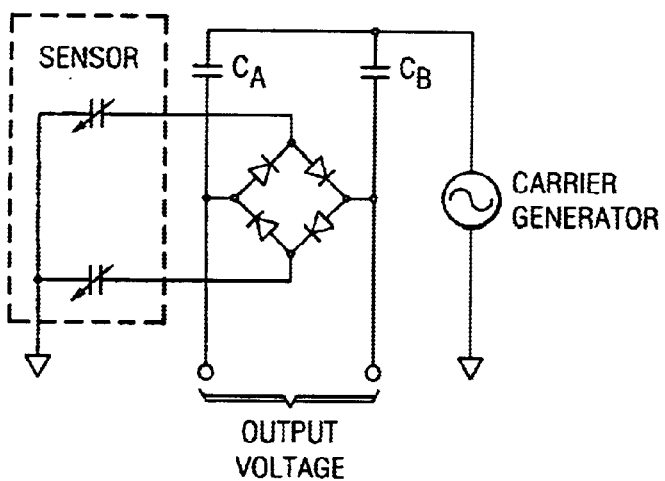
FIG. 1 is a diagram illustrating a balanced diode topology for an electrical interface to a capacitance diaphragm sensor.
Figure 2:
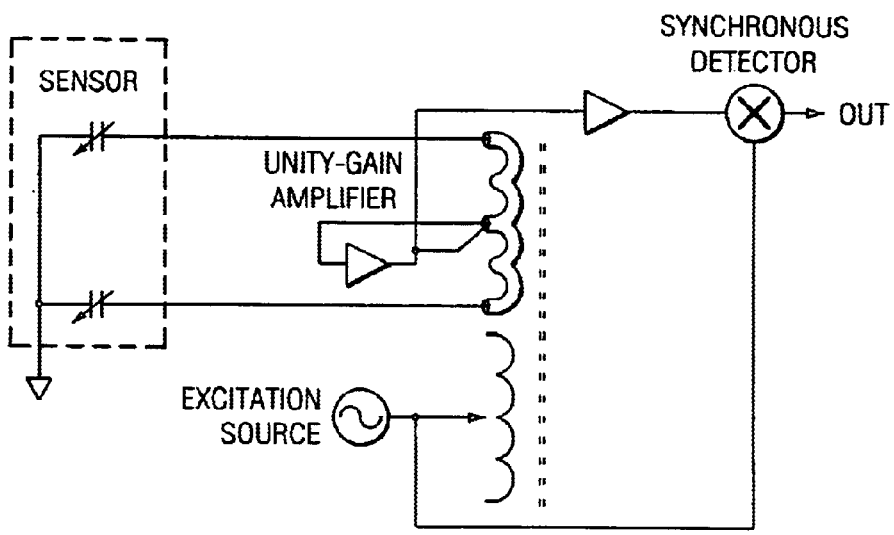
FIG. 2 is a diagram illustrating a guarded-secondary transformer-based bridge topology for an electrical interface to a capacitance diaphragm sensor.
Figure 3:
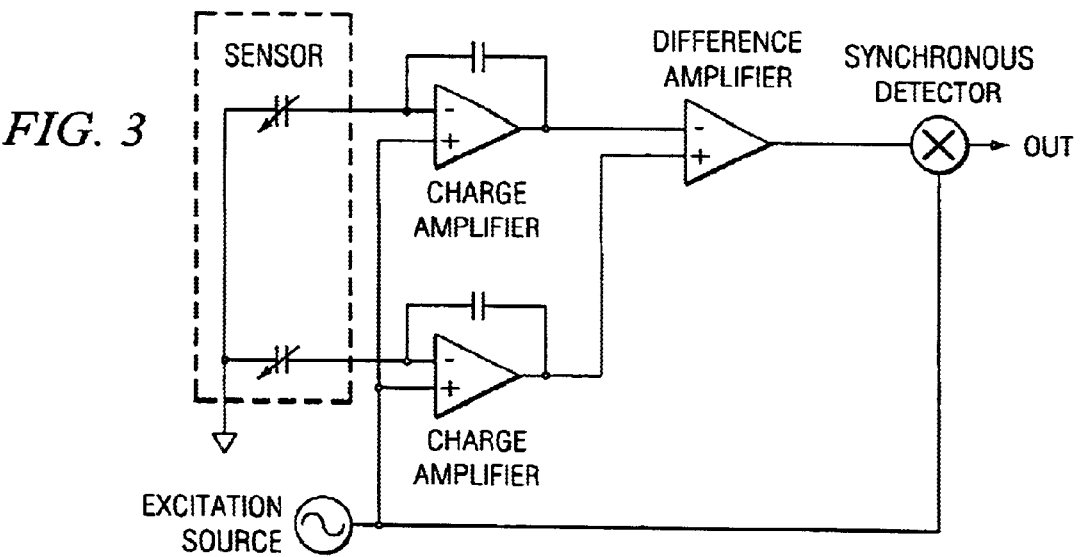
FIG. 3 is a diagram illustrating a matched reference-capacitor bridge topology for an electrical interface to a capacitance diaphragm sensor.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

A preferred embodiment of the invention is described below. It should be noted that this and any other embodiments described below are exemplary and are intended to be illustrative of the invention rather than limiting.

Introduction

Broadly speaking, the invention comprises systems and methods for determining differential currents in a pair of reactive circuits. In a preferred embodiment, the systems and methods are implemented to provide an improved electrical interface to a sensing element such as a CDS. The improved interface may provide improved performance and reduced cost as compared to prior art designs.

In a preferred embodiment, a tightly coupled differencing current transformer is used to generate a differential current. This differential current is input to a low-impedance summing node of a charge amplifier that effectively integrates the differential current. The output of the charge amplifier is passed through a common-mode transformer which is coupled to the excitation voltage source in order to remove the guard potential (corresponding to the excitation voltage) from the output signal. A synchronous detector then converts the resulting signal to a DC level indicative of the differential capacitance of the sensor. This interface provides, e.g., reduced sensitivity to temperature and humidity, low source impedance at a guard source, excellent tracking between a guard potential and the sensor's excitation voltage, ease of construction, low cost and a means of trimming offset directly from the sensor.

Figure 4:
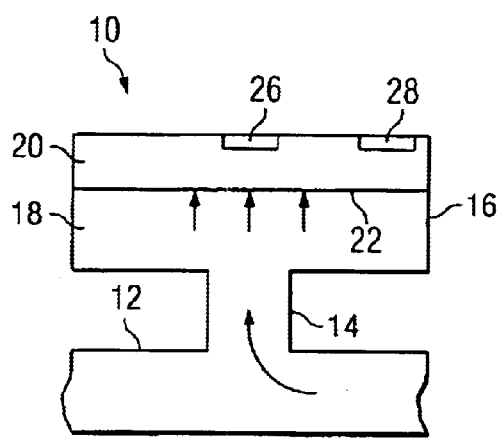
FIG. 4 is a diagram illustrating the general structure of a capacitance diaphragm sensor in one embodiment.

A preferred embodiment of the invention is designed to be used as an interface to a capacitance diaphragm sensor. Referring to FIG. 4, a diagram illustrating the general structure of a CDS is shown. It can be seen from this figure that CDS 10 is configured to be coupled to a conduit 12 through which a gas may flow. The gas is typically employed in a manufacturing process which requires that the pressure of the gas be closely controlled. Gas pressure within conduit 12 is communicated through inlet 14 into housing 16 of the CDS. Housing 16 is divided into two chambers 18 and 20 by a diaphragm 22. Typically, chamber 20 is evacuated so that very low pressures in chamber 18 can be measured. Within chamber 20 lies a substrate supporting two circular concentric capacitor plates, 26 and 28, each of which is maintained in close proximity to diaphragm 22. The flexure of diaphragm 22 will vary with the pressure in chamber 18 (i.e., the pressure of the gas in conduit 12). This will vary the capacitance to ground measured on plates 26 and 28 such that the difference between the capacitance on 26 and 28 will reflect the pressure in chamber 18.

Electrical Structure of CDS

Figure 5:
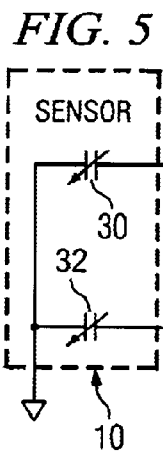
FIG. 5 is a diagram illustrating the electrical structure of a capacitance diaphragm sensor in one embodiment.

Referring to FIG. 5, a diagram illustrating the electrical structure of CDS 10 is shown. In this figure, it can be seen that the electrical components of interest in CDS 10 are capacitors 30 and 32. One of these capacitors consists of a circular electrode that interacts with the periphery of the diaphragm such that movements between the diaphragm and electrode appear as changes in the electrode's capacitance. The second electrode is circular and centered about the CDS's axis. It interacts with the center portion of the diaphragm and changes capacitance as the diaphragm flexes or moves. By subtracting the capacitance of the outermost electrode from that of the innermost electrode, the deflection of the diaphragm can be perceived with little influence by common motion.

In this embodiment, both of the capacitors are variable capacitors. One side of each capacitor is tied to ground, while the other side is tied to the output of the CDS. An appropriate electrical interface can then be coupled to the capacitors to provide an excitation voltage and to sense the differences in capacitance between the two capacitors. As noted above, the prior art interfaces suffer from a number of problems, some or all of which may be resolved by the interface disclosed herein.

Overview of Interface

Figure 6:
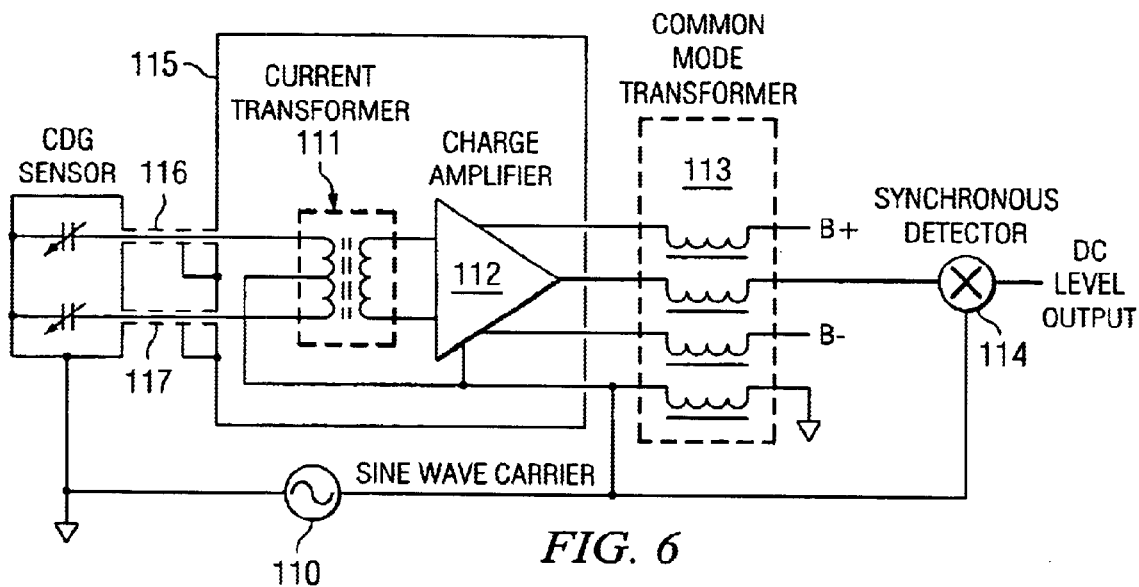
FIG. 6 is a diagram illustrating the design of an electrical interface in accordance with one embodiment of the invention.

Referring to FIG. 6, a diagram illustrating the design of one embodiment of the present interface is shown. CDS 10 is shown at the left side of the figure. The output port of CDS 10 (specifically connections to the capacitive circuits of the CDS) is connected to the primary windings of current transformer 111. Excitation source 110 is also connected to the primary windings of transformer 111. A secondary winding of transformer 111 is connected to the summing node of a charge amplifier 112. The output of charge amplifier 112 is passed through a winding of a common mode transformer 113. Common mode transformer 113 is excited by excitation source 110. Another winding of common mode transformer 113 is connected to excitation source 110. Finally, a synchronous detector 114 is connected to the excitation source 110.

A conductive enclosure 115 is positioned around current transformer 111 and charge amplifier 112. All power and reference connections to the current transformer 111 and charge amplifier 112 operate at the excitation source potential AC-wise via the connection of a common node to the excitation source 110 and the action of common-mode transformer 113. Enclosure 115 is coupled to excitation voltage source 110 to raise the potential of the enclosure to this same potential. Enclosure 115 therefore serves as a shielding structure that provides a guard voltage around the transformer and amplifier which is very close to the voltages at which these components operate. This shielding structure also includes shielding 116, 117 in the form of conductive sleeves around the connections to the CDS. The guard voltage reduces the stray capacitance and leakage in these leads, thereby reducing associated error in the measurement signal. This may allow the use of manufacturing technologies which might otherwise be unavailable (e.g., conventional printed circuit board assembly techniques).

Operation of Interface

Excitation Source.

The electrical interface illustrated in FIG. 6 operates essentially as follows. Excitation source 110 generates a sinusoidal AC excitation voltage. In this embodiment, excitation source 110 is a low-impedance source that provides a 5.8 volt (RMS) sinusoidal signal at 20 kHz. Excitation source 110 drives the CDS through the primary windings of current transformer 111, provides a reference potential for charge amplifier 112 and current transformer 111, and is used to gate the synchronous detector 114. Excitation source 110 is also coupled to enclosure 115 and leads 116 and 117 to provide a guard voltage around the current transformer, the current amplifier, and the sensor leads. In addition, source 110 serves to excite common mode transformer 113 so that the excitation voltage can be removed from the final DC signal level and added to the power supply voltages designated B+ and B−.

Current Transformer.

Excitation voltage from source 110 is applied to the tightly coupled primary windings of current transformer 111. Between excitation source 110 and ground, there are two paths which can be followed by the resulting AC current. A first one of the paths flows through a first half of the current transformer's primary winding and through a first one of the capacitors of CDS 10. The second one of the paths flows through the other half of the primary winding and through the second capacitor of CDS 10.

The current transformer used in the interface is designed so that the two halves of the primary winding are identical. They have the same electrical characteristics, except that the flow of current through each half of the primary winding generates a magnetomotive force which is opposite in polarity to the magnetomotive force generated by the other half. If the capacitances of the two capacitors in CDS 10 are identical, they will have the same impedance to ground. Consequently, the same current will flow through each of the two paths, and the magnetomotive forces induced into current transformer 111 will cancel each other. In this situation, no current is induced on the secondary winding of current transformer 111.

If, on the other hand, there is a difference between the respective capacitances of the CDS capacitors, they will have different impedances with respect to ground. Consequently, more current will flow through one of the paths than the other. As a result of the current differential, the magnetomotive forces generated by the two halves of the primary winding will no longer cancel each other out and the net magnetomotive force will induce a corresponding current on the secondary winding of the current transformer.

Figure 7:
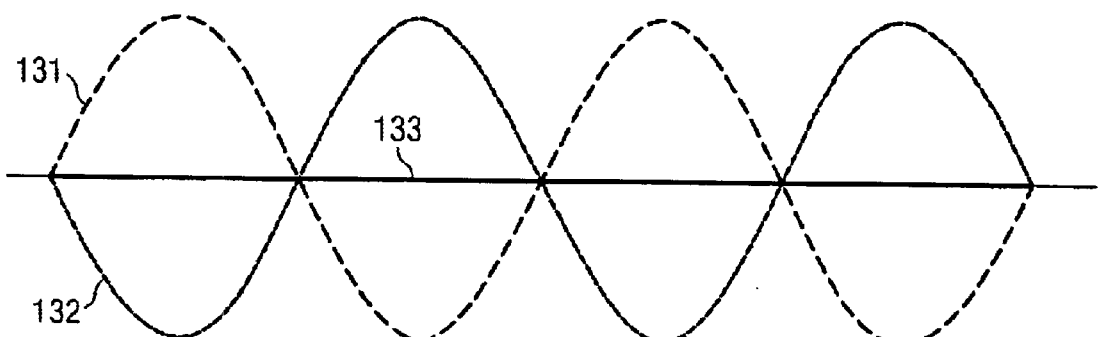
FIGS. 7 and 8 are diagrams illustrating the magnetomotive force generated in the primary windings the current transformer in one embodiment.
Figure 8:
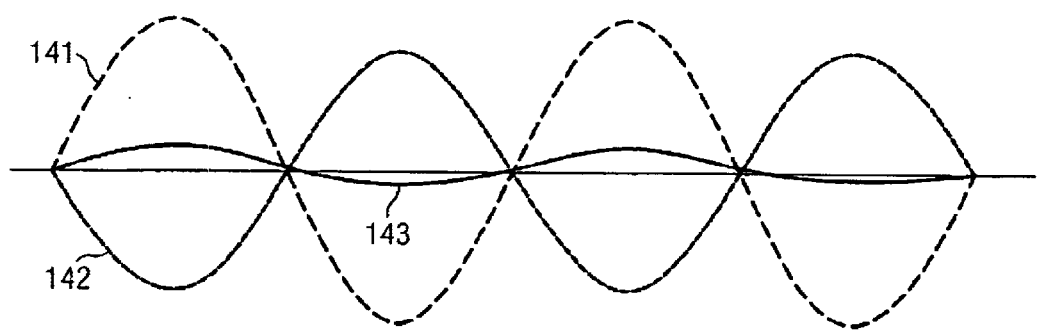

Referring to FIGS. 7 and 8, diagrams illustrate the magnetomotive force induced at the primary windings of the current transformer 111. FIG. 7 shows the condition in which there is no difference in the capacitances of the capacitors in the sensor. Accordingly, the current through each, or each half of the primary windings is the same and the magnetomotive forces (131, 132) corresponding to each, or each half of the primary windings has the same magnitude. Since the magnetomotive force corresponding to each of the primary windings has the opposite polarity of the other, they cancel each other out, resulting in a net magnetomotive force 133 which is null.

FIG. 8 shows the condition in which the capacitance of one of the capacitors is slightly different than the capacitance of the other. The capacitor with the higher capacitance will have a lower impedance and consequently allow more current to flow through it to than the other capacitor. The current flowing through the corresponding primary winding will likewise be greater than the current flowing through the other primary winding. Consequently, the first primary winding will generate a greater magnetomotive force 141 within the current transformer. When this magnetomotive force is combined with that of the other primary winding (142), the result is a net magnetomotive force 143 which is in phase with that of the first primary winding. This net magnetomotive force will induce a current on the secondary winding that is amplified by the charge amplifier and can then be processed to generate a signal indicative of the differential capacitance in the sensor.

Charge Amplifier.

The secondary winding of current transformer 111 is connected to a low-impedance, summing node of charge amplifier 112. This results in a low impedance on the primary windings of the current transformer. In one embodiment, this impedance is less than 100 Ohms at the frequency of the excitation voltage. The coupling to the summing node of the amplifier also provides the benefit of a relatively stable load, which in turn provides the benefit of a dynamically stable circuit.

The current induced on the secondary winding of the current transformer is, essentially, charge per unit time, or coulombs per second. At the excitation frequency, charge amplifier 112 accumulates the charge and outputs a corresponding voltage. Charge amplifier 112 is similar to an integrator and may, in some embodiments, be replaced by an integrator technology. In this embodiment, the output of charge amplifier 112 corresponds to the charge that is being transferred into and out of the sensor. This is done so that the recovered signal is in phase with the excitation source (as shown in FIG. 6, charge amplifier 112 is referenced to the excitation voltage). Otherwise, the two signals would be 90 degrees out of phase.

Common Mode Transformer.

As mentioned above, the output of charge amplifier 112 includes the excitation voltage. This must be removed to determine the actual output of the charge amplifier. The output of the charge amplifier is therefore passed through one of the windings of common mode transformer 113. Another of the transformers windings is connected between excitation voltage source 110 and ground. The EMF resulting from the coupling of the excitation voltage to common mode transformer 113 effectively cancels the excitation voltage out of the signal, leaving only the component of the signal resulting from the current induced on the secondary winding of current transformer 111. The common mode transformer also serves to superimpose the excitation voltage from source 110 unto the charge amplifier's power supply voltages, 'B+' and 'B−'. It should be noted that, in an alternative embodiment, the common mode transformer can be replaced by power supplying amplifiers and an amplifier featuring high common mode rejection.

Synchronous Detector.

Finally, synchronous detector 114 is coupled to common mode transformer 113. Synchronous detector 114 is coupled to the same winding as charge amplifier 112 therefore receives the time-varying component of the output of the charge amplifier with respect to ground. Synchronous detector 114 converts this signal component to a DC level that is indicative of the current differential between the two circuits of the sensor (which, in the case of a CDS, is dependent upon the different capacitances of the two capacitors).

Alternative Embodiments

It should be noted that, while the embodiments of the electrical interface above are described with reference to a CDS (capacitance diaphragm sensor), there may be embodiments which are intended for use with other sensors or circuit pairs. For example, one embodiment might be designed to interface to a capacitive sensor, which is configured to measure slight changes in the position of an element other than a manometer diaphragm (i.e., a non-pressure position sensor). Similarly, it is not necessary that the pair of circuits be limited to capacitive circuits they may be inductive, they may be resistive, or they may have complex impedances arising from multiple circuit components. These and other such variations are contemplated to be within the scope of this disclosure.

Figure 9:
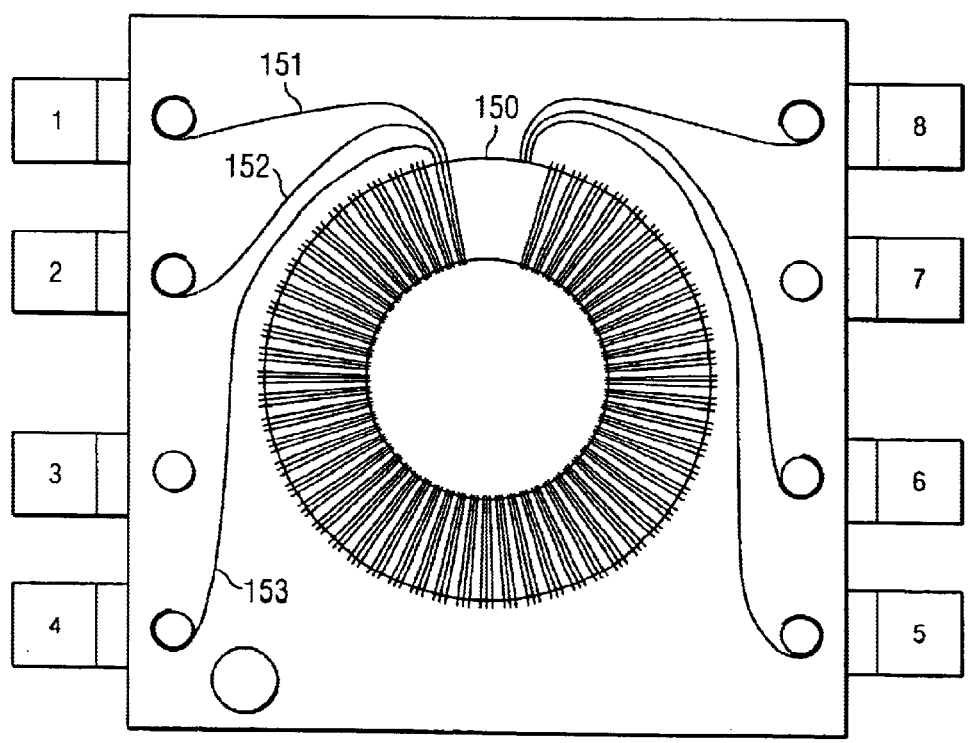
FIG. 9 is a diagram illustrating a current transformer having a toroidal core and two primary windings, as used in one embodiment.

As indicated above, the current transformer depicted in FIG. 6 is a center-tapped transformer. Another type of transformer that may be used in place of the center-tapped transformer is one which has two separate primary windings. Referring to FIG. 9, an example of such a current transformer is shown. This transformer incorporates a toroidal magnetic core 150, around which a set of three wires 151, 152 and 153 are wrapped. Just as with the current transformer described above, this transformer is tightly coupled. Two of the wires (e.g., 151 and 152) are used as the primary windings of the transformer, while the third wire (e.g., 153) is used as the secondary winding. Because it is desired to have the primary windings induce opposite magnetomotive forces, the excitation voltage source would be connected to one of the primary windings at the left-side terminal, and the other primary winding at the right-side terminal. For instance, the excitation voltage source could be connected to terminals 1 and 6, while the sensor leads could be connected to terminals 2 and 5.

In one embodiment, the common mode transformer is also designed around a toroidal magnetic core. Because the common mode transformer may experience flux linkage with the current transformer (and vice versa), the design of the interface should be such that the resulting interference between the two transformers is minimized. Conventionally, this is accomplished by providing shielding between the transformers. The use of the shielding normally causes the size of the interface package (or the sensor package, if the interface is integral to it) to increase. When two transformers of toroidal design are used in the present interface, the need for shielding may be minimized or eliminated by properly orienting the transformers with respect to each other. More specifically, the transformers should be oriented so that, the axes of symmetry of the two toroidal transformers should be orthogonal to each other.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An interface for a capacitance diaphragm sensor (CDS) comprising:

a differencing current transformer having at least one primary winding which is coupled to a port of the CDS;

a charge amplifier coupled to a secondary winding of the current transformer and configured to amplify a signal induced on the secondary winding of the current transformer, a conductive shielding structure positioned around the current transformer and the amplifier;

a common mode transformer having a first winding coupled to receive the amplified signal from the charge amplifier;

an excitation voltage source, wherein the excitation voltage source is coupled to the primary winding of the current transformer and configured to supply an excitation voltage to the port, wherein the excitation voltage source is further coupled to a second winding of the common mode transformer, and wherein the excitation voltage source is further coupled to the shielding structure; and a synchronous detector coupled to the first winding of the common mode transformer and configured to produce a signal voltage corresponding to the differential capacitance of the CDS.

2. The interface of claim 1, wherein the current transformer has two primary windings, each of which is coupled between the excitation voltage source and a corresponding capacitive circuit of the CDS.

3. The interface of claim 1, wherein the shielding structure further comprises conductive sleeves around a pair of leads between the interface and the CDS.

4. The interface of claim 1, wherein the current transformer has a toroidal core.

5. The interface of claim 1, wherein the common mode transformer has a toroidal core.

6. The interface of claim 1, wherein both the current transformer and the common mode transformer have toroidal cores, wherein the axes of symmetry of the current transformer and the common mode transformer are orthogonal to each other.

7. The interface of claim 1, wherein the excitation voltage source is configured to produce a sinusoidal voltage.

8. A device comprising:

a differencing current transformer having one or more primary windings configured to be coupled between a first voltage source and a pair of circuits, wherein current flowing through the one or more primary windings to a first one of the pair of circuits generates a first magnetomotive force (MMF) and wherein current flowing through the one or more primary windings to a second one of the pair of circuits generates a second MMF which is opposite in polarity to the first MMF and wherein the net of the first and second MMFs induces a current on a secondary winding of the differencing current transformer proportional to the difference between the first and second MMFs; and an amplifier coupled to the secondary winding of the differencing current transformer and configured to amplify a difference signal corresponding to the current induced on the secondary winding of the differencing current transformer.

9. The device of claim 8, wherein the amplifier comprises a charge amplifier.

10. The device of claim 8, wherein the one or more primary windings comprise a single, center-tapped primary winding, wherein the a center-tap of the center-tapped primary winding is configured to be coupled to the first voltage source and the ends of the primary winding are configured to be coupled to the pair of circuits.

11. The device of claim 8, wherein the one or more primary windings comprise a pair of primary windings, wherein a first end of each of the pair of primary windings is configured to be coupled to the first voltage source and wherein a second end of each of the pair of primary windings is configured to be coupled to ground.

12. The device of claim 8, wherein the first voltage source is configured to generate a sinusoidal excitation voltage.

13. The device of claim 8, further comprising a shielding structure wherein the shielding structure is configured to carry a guard voltage equal to the voltage of the first voltage source.

14. The device of claim 13, wherein the first voltage source is configured to generate a sinusoidal excitation voltage.

15. The device of claim 8, wherein the pair of circuits comprise a pair of capacitive circuits of a differential capacitance manometer.

16. The device of claim 8, further comprising a common mode transformer having a first winding coupled to receive the amplified signal from the amplifier and a second winding configured to be coupled to a guard voltage source.

17. The device of claim 16, wherein the guard voltage source comprises the first voltage source.

18. The device of claim 17, further comprising a synchronous detector coupled to the excitation first voltage source and coupled to a ground referenced output from the amplifier and configured to produce a DC signal voltage corresponding to an imbalance in impedances at the one or more primary windings of the current transformer.

19. The device of claim 8, further comprising a differential capacitance manometer.

20. The device of claim 8, wherein the differencing current transformer comprises a low-impedance current transformer.

21. The device of claim 9, further comprising one or more power supplying amplifiers and an amplifier having high common-mode rejection, wherein the high common mode rejection amplifier is coupled to receive the amplified signal from the charge amplifier and is also configured to be coupled to a guard voltage source.

22. A method for measuring current differential comprising: coupling one or more primary windings of a current transformer to each of a pair of circuits in which a current differential is to be measured, wherein the current in each circuit generates an magnetomotive force (EMF) which is out of phase with the current in the other circuit; coupling a secondary winding of the current transformer to an amplifier; amplifying a signal induced on the secondary winding of the current transformer; and generating an amplified signal corresponding to the signal induced on the secondary winding of the current transformer.

23. The method of claim 22, wherein the signal induced on the secondary winding of the current transformer comprises an alternating current (AC) signal and wherein the method further comprises rectifying the signal to produce a direct current (DC) signal.

24. The method of claim 22, wherein the amplified signal includes a component corresponding to a guard voltage, wherein the method further comprises removing the component corresponding to the guard voltage.

25. The method of claim 24, wherein removing the component corresponding to the guard voltage comprises passing the amplified signal through a first winding of a common mode transformer, wherein the guard voltage is applied to a second winding of the common mode transformer.

26. The method of claim 22, wherein the one or more primary windings of the current transformer comprise a single, center-tapped primary winding, wherein each of the pair of circuits in which the current differential is to be measured is connected to an opposite end of the primary winding and wherein the method further comprises applying an excitation voltage to the center tap of the primary winding.

27. The method of claim 26, wherein the electrical impedance of the portion of the primary winding between a source of the excitation voltage and one of the pair of circuits is substantially equal to the electrical impedance of the portion of the primary winding between the excitation source and the other of the pair of circuits.

28. The method of claim 22, wherein generating the amplified signal corresponding to the signal induced on the secondary winding of the current transformer comprises coupling the secondary winding to a charge amplifier.

29. The method of claim 22, further comprising passing the amplified signal through a synchronous detector.

30. The method of claim 29, wherein the synchronous detector is coupled to an excitation source.

31. The method of claim 22, further comprising providing a guard voltage surrounding the current transformer and amplifier.

32. The method of claim 31, wherein the guard voltage comprises a voltage applied to each of the one or more primary windings of the current transformer.

33. The method of claim 32, wherein the amplifier is referenced to the guard voltage.

\* \* \* \* \*

UNITED STATES PATENT AND TRADEMARK OFFICE
CERTIFICATE OF CORRECTION

PATENT NO. : 6,734,659 B1
DATED : May 11, 2004
INVENTOR(S) : Michael W. Fortner

It is certified that error appears in the above-identified patent and that said Letters Patent is hereby corrected as shown below:

Column 11,
Line 46, delete "excitation"

Signed and Sealed this

Twenty-second Day of March, 2005

JON W. DUDAS
*Director of the United States Patent and Trademark Office*